US010618736B2

(12) United States Patent
Khodl et al.

(10) Patent No.: US 10,618,736 B2
(45) Date of Patent: Apr. 14, 2020

(54) AUTONOMOUS MOBILE PICKING

(71) Applicant: Dematic Corp., Grand Rapids, MI (US)

(72) Inventors: Michael S. Khodl, Ada, MI (US); David M. Berghorn, Waterford, MI (US); Todd S. Hunter, Marietta, GA (US)

(73) Assignee: Dematic Corp., Grand Rapids, MI (US)

( * ) Notice: Subject to any disclaimer, the term of this patent is extended or adjusted under 35 U.S.C. 154(b) by 137 days.

(21) Appl. No.: 15/874,194

(22) Filed: Jan. 18, 2018

(65) Prior Publication Data

US 2018/0141755 A1 May 24, 2018

Related U.S. Application Data

(60) Continuation of application No. 15/372,636, filed on Dec. 8, 2016, now Pat. No. 9,919,872, which is a
(Continued)

(51) Int. Cl.
*G06F 7/00* (2006.01)
*B65G 1/137* (2006.01)
(Continued)

(52) U.S. Cl.
CPC ............ *B65G 1/1375* (2013.01); *B25J 5/007* (2013.01); *B65G 1/1378* (2013.01); *G06Q 50/30* (2013.01); *B65G 2209/06* (2013.01); *G05B 2219/32037* (2013.01); *G05B 2219/40006* (2013.01); *G05B 2219/40014* (2013.01); *G05B 2219/40078* (2013.01); *G05B 2219/40154* (2013.01);
(Continued)

(58) Field of Classification Search
None
See application file for complete search history.

(56) References Cited

U.S. PATENT DOCUMENTS

| 6,721,444 | B1 | 4/2004 | Gu et al. |
| 7,402,018 | B2 | 7/2008 | Mountz et al. |

(Continued)

FOREIGN PATENT DOCUMENTS

| DE | 102012016522 A1 | 3/2013 | |
| EP | 0169156 A1 * | 1/1986 | ................ B66F 9/07 |

(Continued)

OTHER PUBLICATIONS

Article entitled "Wynsoft™ Decant," Wynright Daifuku North America, Software Solutions, printed Jul. 28, 2013.
(Continued)

*Primary Examiner* — Yolanda R Cumbess
(74) *Attorney, Agent, or Firm* — Gardner, Linn, Burkhart & Ondersma LLP

(57) ABSTRACT

An order-picking method includes autonomously routing a plurality of mobile robotic units in an order fulfillment facility and picking articles to or putting articles from the robotic units in the order fulfillment facility. A material-handling robotic unit that is adapted for use in an order fulfillment facility includes an autonomous mobile vehicle base and a plurality of article receptacles positioned on the base. A visual indicator associated with the receptacle facilitates picking articles to or putting articles from the robotic unit.

19 Claims, 11 Drawing Sheets

Related U.S. Application Data division of application No. 14/479,908, filed on Sep. 8, 2014, now Pat. No. 9,550,624.

(60) Provisional application No. 61/875,341, filed on Sep. 9, 2013.

(51) Int. Cl.
  *G06Q 50/30* (2012.01)
  *B25J 5/00* (2006.01)
  *G06Q 50/28* (2012.01)

(52) U.S. Cl.
  CPC .............. *G05B 2219/40298* (2013.01); *G05B 2219/45045* (2013.01); *G05B 2219/45063* (2013.01); *G06Q 50/28* (2013.01)

(56) References Cited

U.S. PATENT DOCUMENTS

| | | |
|---|---|---|
| 7,826,919 B2 | 11/2010 | D'Andrea et al. |
| 7,850,413 B2 | 12/2010 | Fontana |
| 7,873,469 B2 | 1/2011 | D'Andrea et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 7,920,962 B2 | 4/2011 | D'Andrea et al. |
| 7,991,505 B2 | 8/2011 | Lert, Jr. et al. |
| 8,068,978 B2 | 11/2011 | D'Andrea et al. |
| 8,170,711 B2 | 5/2012 | D'Andrea et al. |
| 8,220,710 B2 | 7/2012 | Hoffman et al. |
| 8,239,291 B2 | 8/2012 | Hoffman et al. |
| 8,265,873 B2 | 9/2012 | D'Andrea et al. |
| 8,280,546 B2 | 10/2012 | D'Andrea et al. |
| 8,280,547 B2 | 10/2012 | D'Andrea et al. |
| 8,311,902 B2 | 11/2012 | Mountz et al. |
| 8,412,400 B2 | 4/2013 | D'Andrea et al. |
| 8,425,173 B2 | 4/2013 | Lert et al. |
| 8,538,692 B2 | 9/2013 | Wurman et al. |
| 8,606,392 B2 | 12/2013 | Wurman et al. |
| 8,812,147 B2 | 8/2014 | Keller et al. |
| 9,089,969 B1 | 7/2015 | Theobald |
| 9,242,799 B1 | 1/2016 | O'Brien et al. |
| 9,561,587 B2 | 2/2017 | Wellman et al. |
| 9,901,210 B2 * | 2/2018 | Chan ................... A47J 37/0713 |
| 2004/0093650 A1 | 5/2004 | Martins et al. |
| 2008/0040040 A1 | 2/2008 | Goto et al. |
| 2008/0086236 A1 | 4/2008 | Saito et al. |
| 2008/0154391 A1 | 6/2008 | Nakamura et al. |
| 2008/0167739 A1 | 7/2008 | Lin et al. |
| 2009/0099688 A1 | 4/2009 | Salamanca |
| 2009/0302795 A1 | 12/2009 | Nichols et al. |
| 2010/0044414 A1 | 2/2010 | Charbel et al. |
| 2010/0092032 A1 | 4/2010 | Boca |
| 2010/0204824 A1 | 8/2010 | Luce et al. |
| 2011/0163160 A1 | 7/2011 | Zini et al. |
| 2012/0029685 A1 | 2/2012 | Keller et al. |
| 2013/0173049 A1 | 7/2013 | Brunner et al. |
| 2013/0177379 A1 | 7/2013 | Hoffman et al. |
| 2013/0245811 A1 | 9/2013 | Holmes |
| 2013/0317642 A1* | 11/2013 | Asaria ................... G06Q 50/28 700/216 |
| 2014/0244026 A1 | 8/2014 | Neiser |
| 2014/0365258 A1 | 12/2014 | Vestal et al. |
| 2015/0032252 A1 | 1/2015 | Galluzzo et al. |
| 2015/0073589 A1 | 3/2015 | Khodl et al. |
| 2015/0332213 A1 | 11/2015 | Galluzzo et al. |
| 2016/0244262 A1 | 8/2016 | O'Brien et al. |

FOREIGN PATENT DOCUMENTS

| | | |
|---|---|---|
| EP | 0169156 A1 | 1/1986 |
| FR | 2631721 A1 | 11/1898 |
| GB | 2174686 A | 11/1986 |
| JP | S597605 A | 1/1984 |
| WO | 2008967516 A2 | 6/2008 |

OTHER PUBLICATIONS

International Search Report (Form PCT/ISA/210) and Written Opinion of the International Searching Authority (Form PCT/ISA/237) from corresponding Patent Cooperation Treaty Application No. PCT/US2014/054544, dated Dec. 31, 2014.

Hulyacardas, New Autonomous Indoor Vehicle: Adept Lynx. Robotic Magazine, Feb. 2, 2013 (Feb. 2, 2013), retrieved from the Internet (Nov. 23, 2014). <URL>http://www.roboticmagazine.com/military-medical-vehicles/new-autonomous-indoor-vehicle-adept-lynx> entire document.

International Preliminary Report on Patentability from corresponding Patent Cooperation Treaty Patent Application No. PCT/US2014/054544 dated Mar. 15, 2016.

* cited by examiner

AUTONOMOUS MOBILE PICKING

CROSS REFERENCE TO RELATED APPLICATION

The present application is a continuation of U.S. patent application Ser. No. 15/372,636, filed on Dec. 8, 2016, which is a division of U.S. patent application Ser. No. 14/479,908, filed on Sep. 8, 2014, now U.S. Pat. No. 9,550,624, issued Jan. 24, 2017, which claims priority from U.S. patent application Ser. No. 61/875,341, filed on Sep. 9, 2013, the disclosure of which is hereby incorporated herein by reference.

BACKGROUND OF THE INVENTION

The present invention is directed to a method of order picking and an apparatus for use with such method. The invention can be used for e-commerce, mail order or phone-in order fulfillment or for split-case picking in a distribution warehouse, or the like.

Picking of items in a warehouse is typically a labor-intensive activity. A number of pickers are provided instructions, using visual displays, voice commands, or the like, that directs the pickers to retrieve a certain number of items from a particular location at a picking shelf or bin. The pickers pick the items to receptacles which are then conveyed to order assembly stations, such as a put-station where individual orders are collected and packaged by yet more persons. Also, replenishment of the items stocked at the picking facility requires facilities to convey the goods from a decant area where the goods are received in larger containers, such as cases and/or pallets.

SUMMARY OF THE INVENTION

The present invention is directed to an order-picking method and material-handling robotic unit that is adapted for use in an order fulfillment facility that is capable of autonomous mobile picking yet is capable of augmentation with humans. In this manner, labor costs can be reduced while the installed capital equipment can be sized for a base-line level of orders and capacity added by adding additional humans.

An order-picking method, according to an aspect of the invention, includes autonomously routing a plurality of mobile robotic units in an order fulfillment facility and picking articles to or putting articles from the robotic units in the order fulfillment facility.

The picking articles to or putting articles from the robotic units may include manually picking product to or putting product from pick stations in said facility. The robotic units may be adapted to alter the planned path of movement in order to function in the presence of the persons, wherein said robotic units and the persons can function together in said order fulfillment facility.

The robotic unit(s) may include a plurality of receptacle supports, and the method may include picking articles to receptacles at the supports and/or putting articles from the receptacles. The indicator system may indicate which of the receptacles to pick an article to or put an article from. The indicator system may include a plurality of visual indicators, each associated with one of said receptacles.

At least one of the robotic units may include a robotic arm and the method include picking articles or putting articles with the robotic arm. The method may include picking articles to or putting articles with the robotic arm from another of the robotic units. At least one of the robotic units may be coupled to travel with the another of the robotic units as a pair of robotic units.

The material-handling facility may include at least one pick station and the picking articles may include picking articles from the at least one pick station. The putting articles may include putting articles to the at least one pick station in order to replenish the at least one pick station. The putting articles may include putting articles to the pick station(s) in order to replace articles returned by a consumer.

The material-handling facility may have a stationary automated order-picking station and the putting of articles includes docking the robotic units to the order-picking station wherein the order-picking station pick receives articles put from said robotic units. The automated order-picking station may pick articles directly from said robotic vehicles.

A plurality of the robotic units may be coupled in a train of robotic units. At least one of the robotic units in the train of robotic units may be a tow vehicle that propels the other of said robotic units in the train of robotic units. At least one of the robotic units may be configured to carry at least one pallet and the method may include transporting pallets in the facility with one of the mobile robotic units. The facility may include at least one decanting station and picking stations and the method may include picking items to the mobile robotic units at the decanting station and putting items from the mobile robotic units to the picking stations for replenishment of the picking stations. The facility may include an article storage station and the method may include picking articles to the mobile robotic units from the storage station and putting articles from the robotic units to the storage station. The article storage station may include a manual station, an automated storage and retrieval system, a shuttle-based automated three-dimensional warehouse and/or a mini-load station. The method may include picking documents to and putting documents from the mobile robotic units.

The order fulfilment facility may include a stationary robotic system conducting order fulfilment and/or inventory replenishment operations. The stationary robotic system may include a stationary robot and vision equipment to store with the robot to an assignment location product that is retrieved from a receptacle with the robot, or vice versa. Receptacles may be supplied to the mobile robotic unit with a conveyor system and a human operator may transfer inventory receptacles between the conveyor system and the mobile robotic unit. A human operator may transfer receptacles between the mobile robotic unit and the stationary robotic system. The vision equipment may locate the position of the product in two-dimensional (2D) coordinates and using the 2D coordinates as a common reference frame for the vision equipment and the robot and create a three-dimensional (3D) point cloud of product with the vision equipment. The vision equipment may use a blob algorithm to identify connected surfaces to identify product. A human operator or the stationary robot may retrieve an empty receptacle from the stationary robotic system and move the empty receptacle to or from the assignment location. A human operator may load an empty receptacle from the assignment location as directed by an indicator system to complete the order. A rail-supported vehicle may remove a completed receptacle from the pick or put operation.

A material-handling robotic unit that is adapted for use in an order fulfillment facility, according to an aspect of the invention, includes an autonomous mobile vehicle base and a plurality of article receptacles positioned on the base. A visual indicator associated with the receptacle facilitates picking articles to or putting articles from the robotic unit.

These and other objects, advantages and features of this invention will become apparent upon review of the following specification in conjunction with the drawings.

DESCRIPTION OF THE PREFERRED EMBODIMENT

Figure 1:
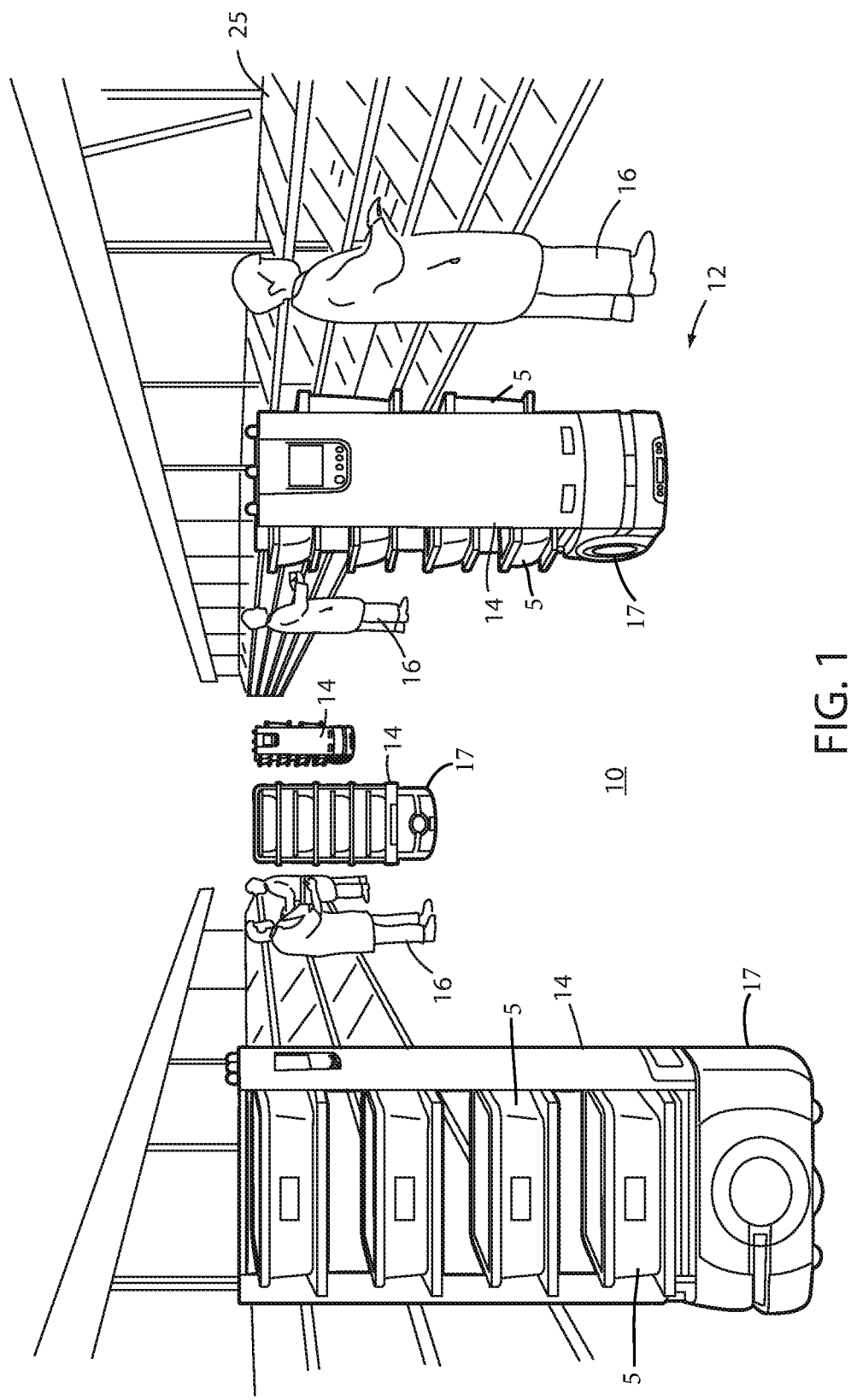
FIG. 1 is a perspective view of an order-picking method according to an embodiment of the invention.

Referring now to the drawings and the illustrative embodiments depicted therein, an order-picking method 10 is carried out in an order fulfillment facility 12 using a plurality of mobile robotic units 14 operating autonomously or semi-autonomously in order fulfillment facility 12. The term "order fulfillment facility" is intended to be used in a broad sense of the term to include fulfillment of orders placed by individuals, which typically involve one or more individual items ordered on-line or through a catalog, as well as full case and split case orders that are bound for individual stores of a chain of retail establishments, or the like. Robotic units 14 are especially configured to facilitate picking articles to the robotic unit. It may also be used for putting articles from the robotic units in the order fulfillment facility. Method 10 may include manually picking product to or putting product from receptacles 5 in facility 12 using humans illustrated at 16. This is feasible because robotic units 14 are adapted to alter planned path of movement in the presence of the humans. In this manner, robotic units 14 and humans 16 can function together in said order fulfillment facility. In the illustrated embodiment, robotic units 14 include an autonomous vehicle base 17 that is marketed by Adept Technology, Inc. under the Lynx brand, although other autonomous vehicles may be used. Autonomous vehicle base 17 is capable of self-navigation from any starting point in fulfillment facility 12 to any utilization point without special infrastructure, such as magnets, stationary lasers, or the like. Also, autonomous vehicle base 17 is capable of sensing humans and unanticipated obstructions and modifying its path plan to avoid the human/obstruction without any further intervention.

Robotic units 14 include a plurality of receptacle supports 18 that may be positioned on one or both sides of the vehicle. Articles may be picked to receptacles, such as totes or cartons placed on supports 18, such as part of a pick function. For example, split case and item level pick functions 32 may be carried out. Articles may also be taken from receptacles on supports 18, such as part of a put function. For example, articles may be taken from receptacles on supports 18 and combined as customer orders in a put operation, such as at a conventional put wall, goods-to-person station, or the like. Moreover, supports 18 can be at a horizontal position thereby allowing the receptacles supported thereon to be horizontal. This allows the receptacles to interface with other material-handling equipment, such as conveyors, vehicles, or the like. In order to facilitate such pick and put function, robotic units 14 may include an indicator system 20. Indicator system 20 indicates which of receptacles on supports 18 to pick an article to or which of receptacles on supports 18 to take, or put, an article from. In the illustrated embodiment, indicator system 20 includes a series of visual indicators, such as lamps, each associated with one of supports 18 to inform an operator which receptacle to put item(s) to or retrieve item(s) from. In addition, or alternatively, robotic units 14 include an interface unit 23 that may be used to display to an operator information, such as a number of each item to be picked. It may also receive operator input, such as confirmation of the number of units picked, or the like. In the illustrated embodiment, interface unit 23 is a portable digital device, such as a computer tablet of the type known in the art and marketed by various companies, such as the Apple iPad, and the like. Additionally, instructions to a pick/put operator may be supplied using voice picking as is known in the art.

Figure 2:
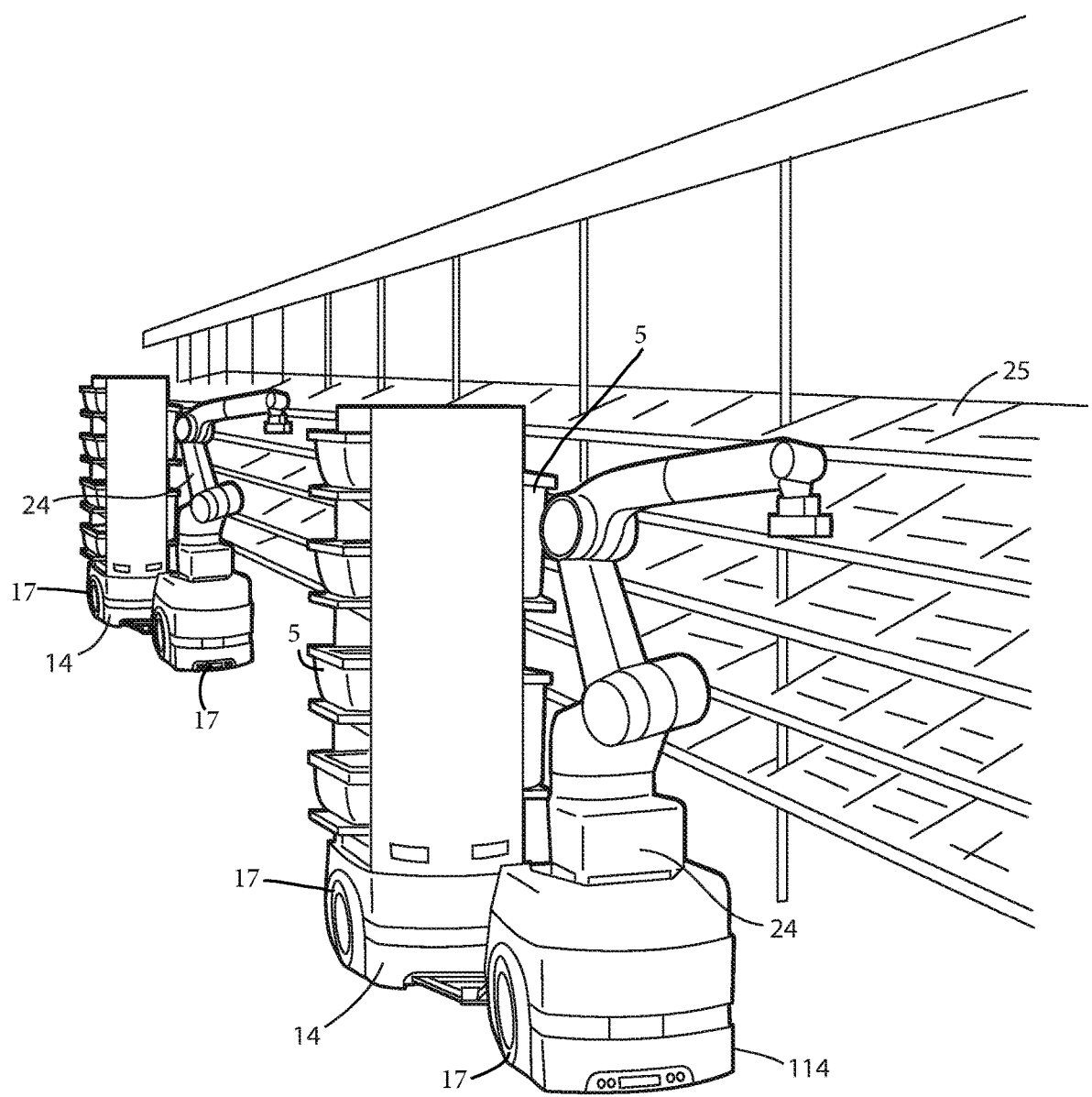
FIG. 2 is the same view as FIG. 1 of an alternative embodiment thereof.
Figure 3:
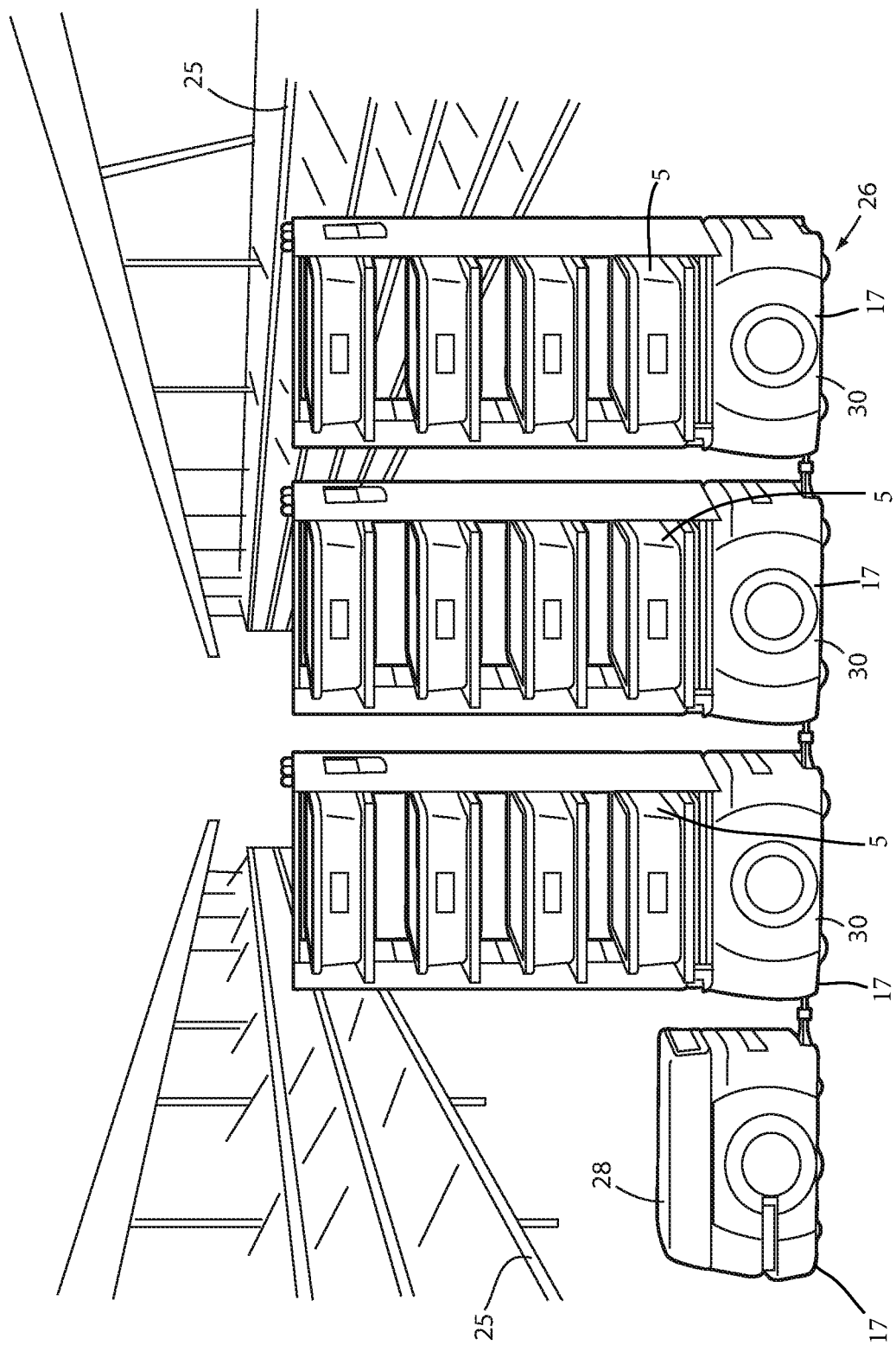
FIG. 3 is the same view as FIG. 1 of another alternative embodiment thereof.
Figure 4:
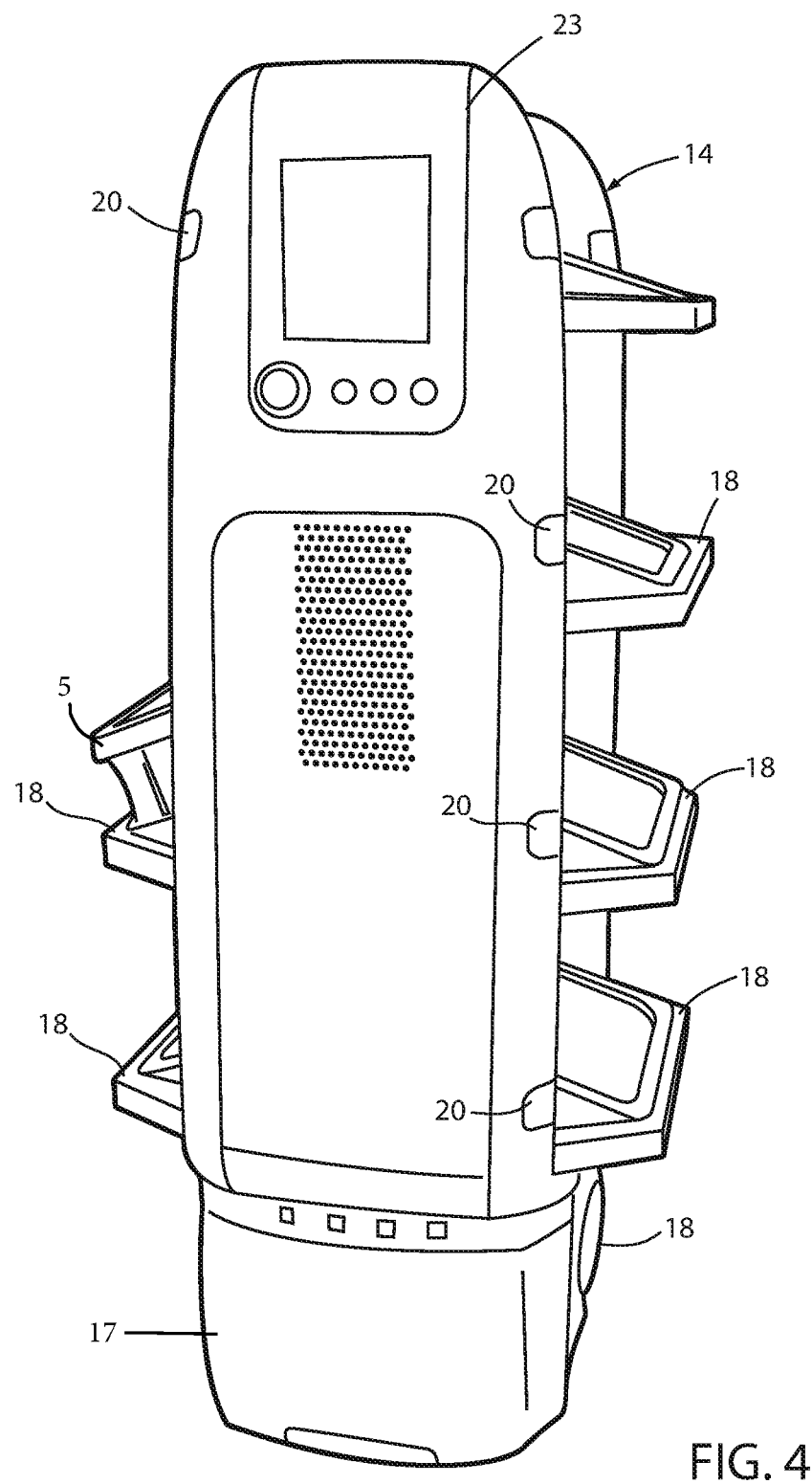
FIG. 4 is a perspective view of a material-handling robotic unit.
Figure 5:
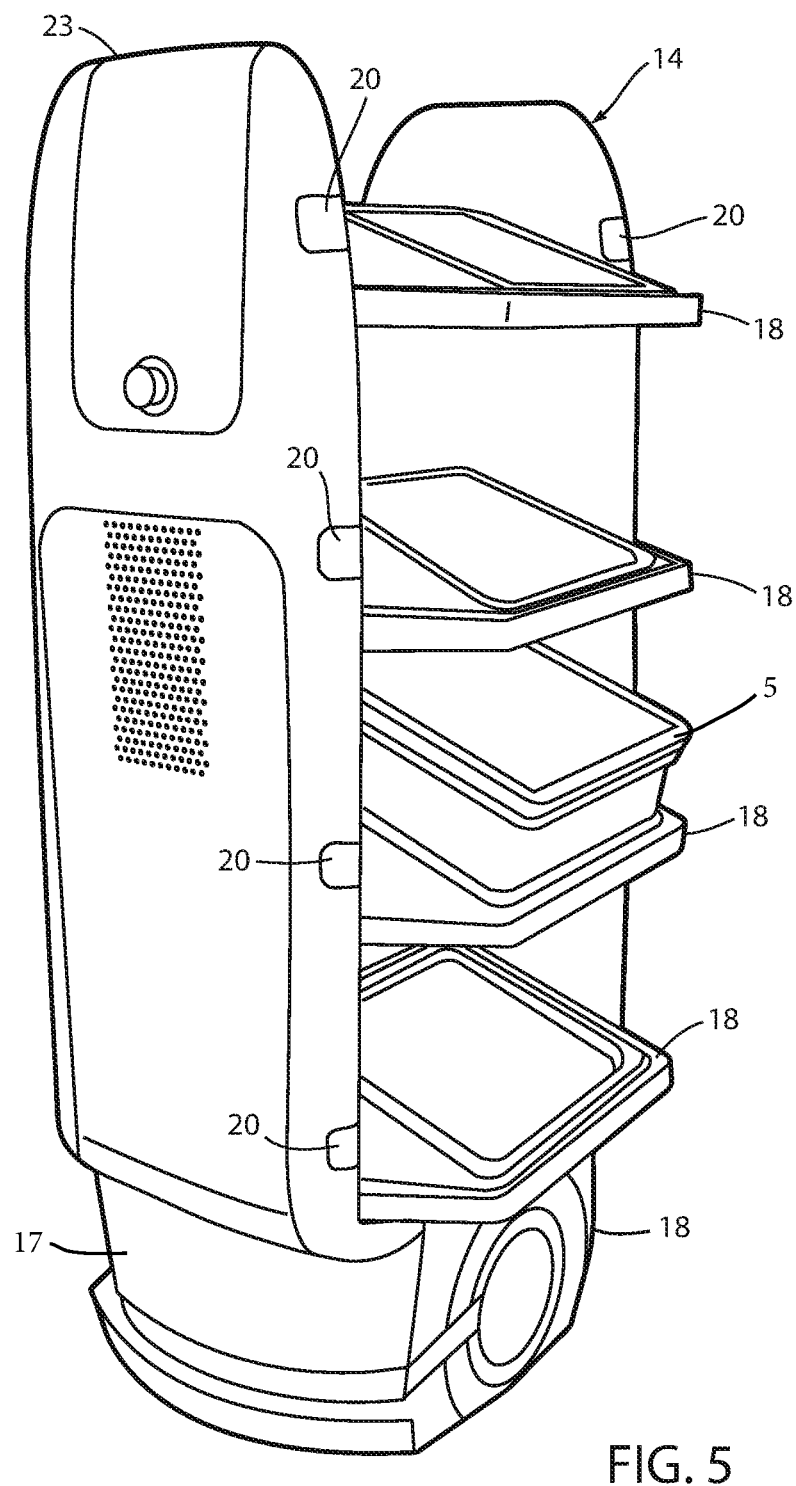
FIG. 5 is the same view as FIG. 4 taken from an opposite direction.

Method 10 may include robotic units 114 that include a robotic arm 24. Robotic arm 24 is capable of picking articles to a robotic unit 14 or putting articles from a robotic unit 14. Robotic arm is a 6-axis articulated robot, such as marketed by various manufactures, such as Adept Technologies, Inc. under a Viper mark. However, 4-axis robots can be used for some applications. Robotic arm 24 uses machine vision to identify the position of an item to pick up and/or to identify the item to be picked. A robotic unit 114 having an arm 24 may be coupled with a robotic unit 14 and operated as a combined unit with arm 24 picking to or putting from receptacles 5 on supports 18 on robotic unit 14, as best illustrated in FIG. 2. FIG. 2 illustrates robotic arm 24 picking articles from a pick station 25. Thus, the entire pick and/or put function can be carried out automatically without human intervention. However, for peak flow periods, humans 16 may be added to method 10 and used along side the robotic units.

Method 10 may further includes a plurality of trains 26 made up of slave robotic units 30 that are coupled in a train of robotic units with a master robotic unit 28. In this fashion, master robotic unit 28 functions as a tow vehicle to propel slave units 30.

Other variations of robotic units are deemed to be comprehended herein. For example, at least one of the robotic units may be configured to carry at least one pallet and the method including transporting pallets in facility 10.

Figure 6:
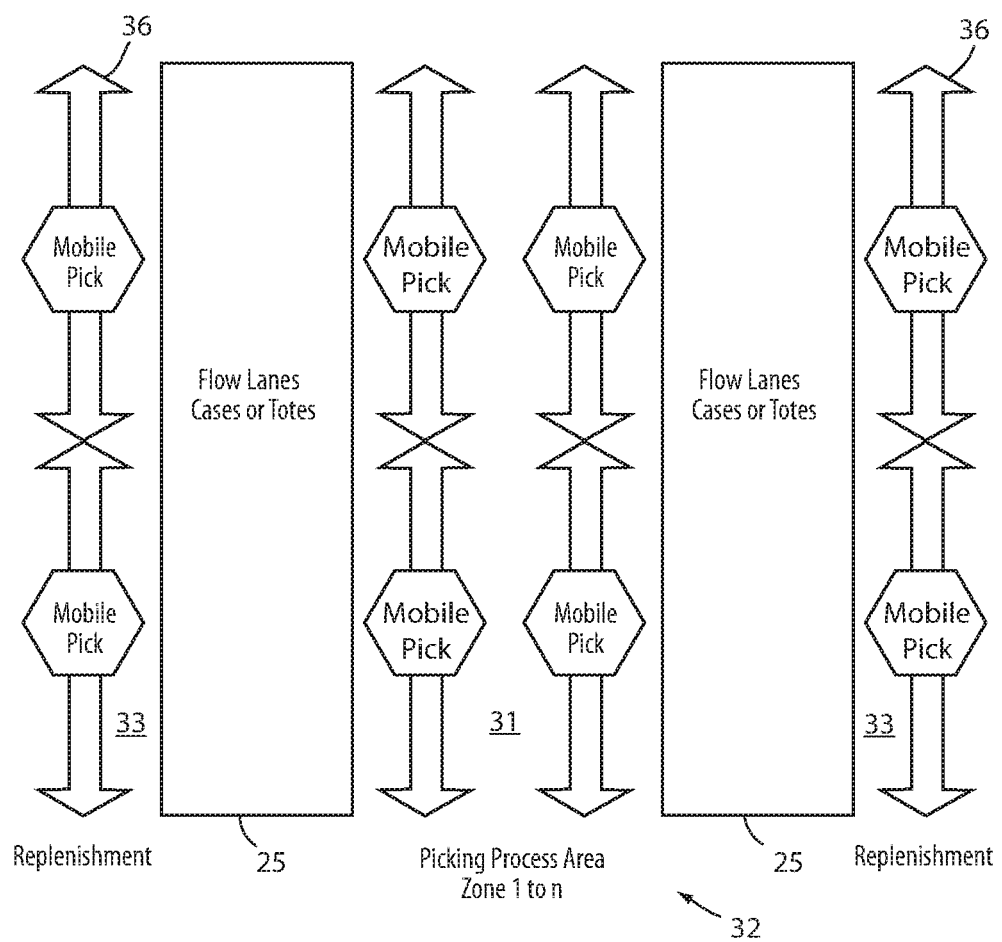
FIG. 6 is a diagram illustrating split case and item level picking functions.

A split case/item level pick function 32 is illustrated in FIG. 6. In such function, the robotic units are used in a pick tunnel 31 with or without humans to pick from pick stations 25. Other mobile robotic units are used in replenishment aisles 33 in order to replenish at least one pick stations 25. Function 32 is useful for picking discrete sort orders where each receptacle represents a store destination. It may also be used to batch pick to a tote or carton whether the tote/carton is destined to a put wall or a goods-to-person station for multi-line order consolidation. It was also to be used to batch pick to a tote or carton for single line orders where the tote or carton is destined to a packing and shipping function. Higher levels of warehouse management software may be used to establish priority level of control of method 10 for managing overall material flow and order fulfillment.

Figure 7:
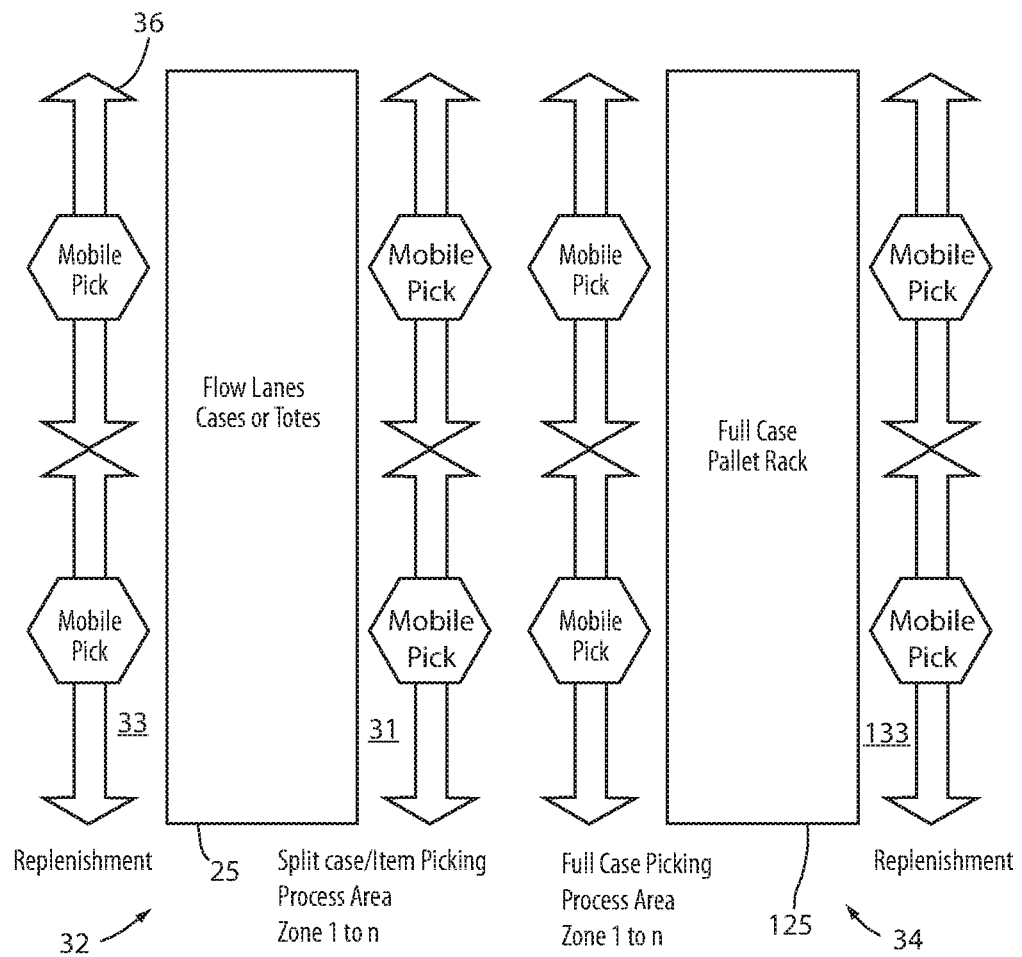
FIG. 7 is a diagram illustrating split case and item level picking functions in combination with full case picking function.

A full case pick function 34 can be added as seen in FIG. 7. Function 34 includes a full case pick station 125 that utilizes the mobile robotic units to carry a pallet to pick locations 125. This function may be used for discrete store orders where a tote or carton represents a store destination or where the pallet is built in a store or aisle-ready format. Replenishment of pick locations 125 can take place by mobile robotic vehicles in a replenishment aisle 133.

Figure 8:
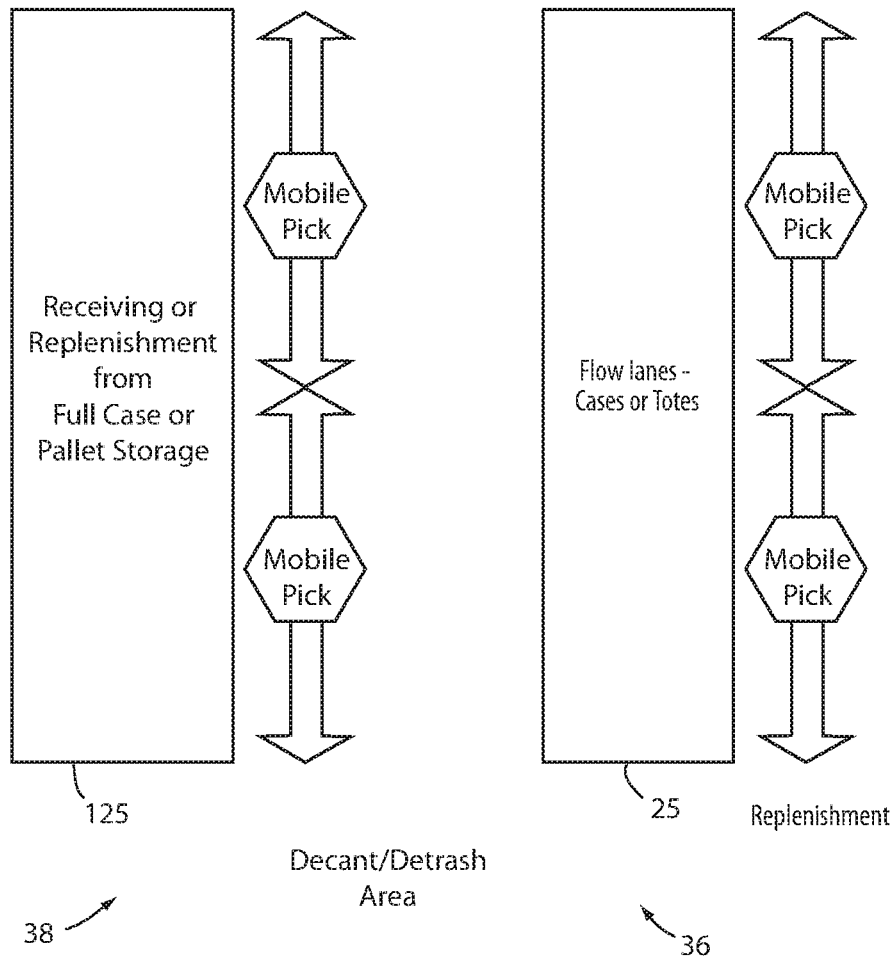
FIG. 8 is a diagram illustrating decanting and de-trashing functions.

As can be seen in FIG. 8, replenishment function 36 involves items being placed in a receptacle 18, such as a tote or carton, and routed to pick station 25 or to a storage area 125. A decant and de-trash function 38 may be provided.

Figure 9:
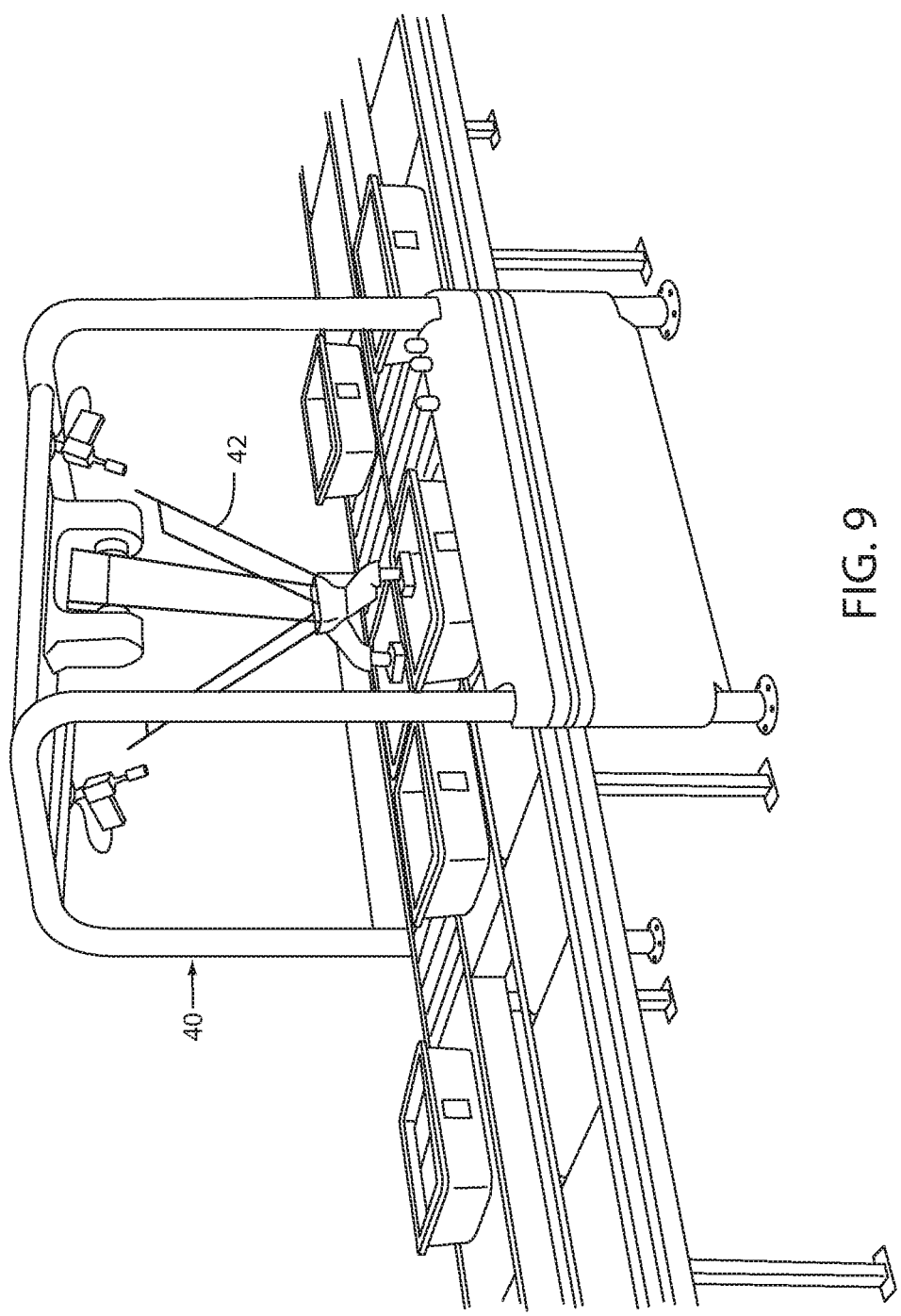
FIG. 9 is a perspective view of an automated order-picking station useful with the method.

The mobile robotic units can also be used with an automated pick station 40, as illustrated in FIG. 9. Pick station 40 includes a stationary picking arm 42 for use in picking items from a supply tote or carton and placing the items in order totes or cartons. A mobile robotic unit 14 (not shown in FIG. 9) can be docked along side of pick station 40 with picking arm 42 picking directly from receptacles 18 and placing the picked items directly to an order tote, or the like. Other functions are possible. For example, method 10 may include picking of documents to a robotic unit 14 and putting documents from the robotic units to a destination.

Figure 10:
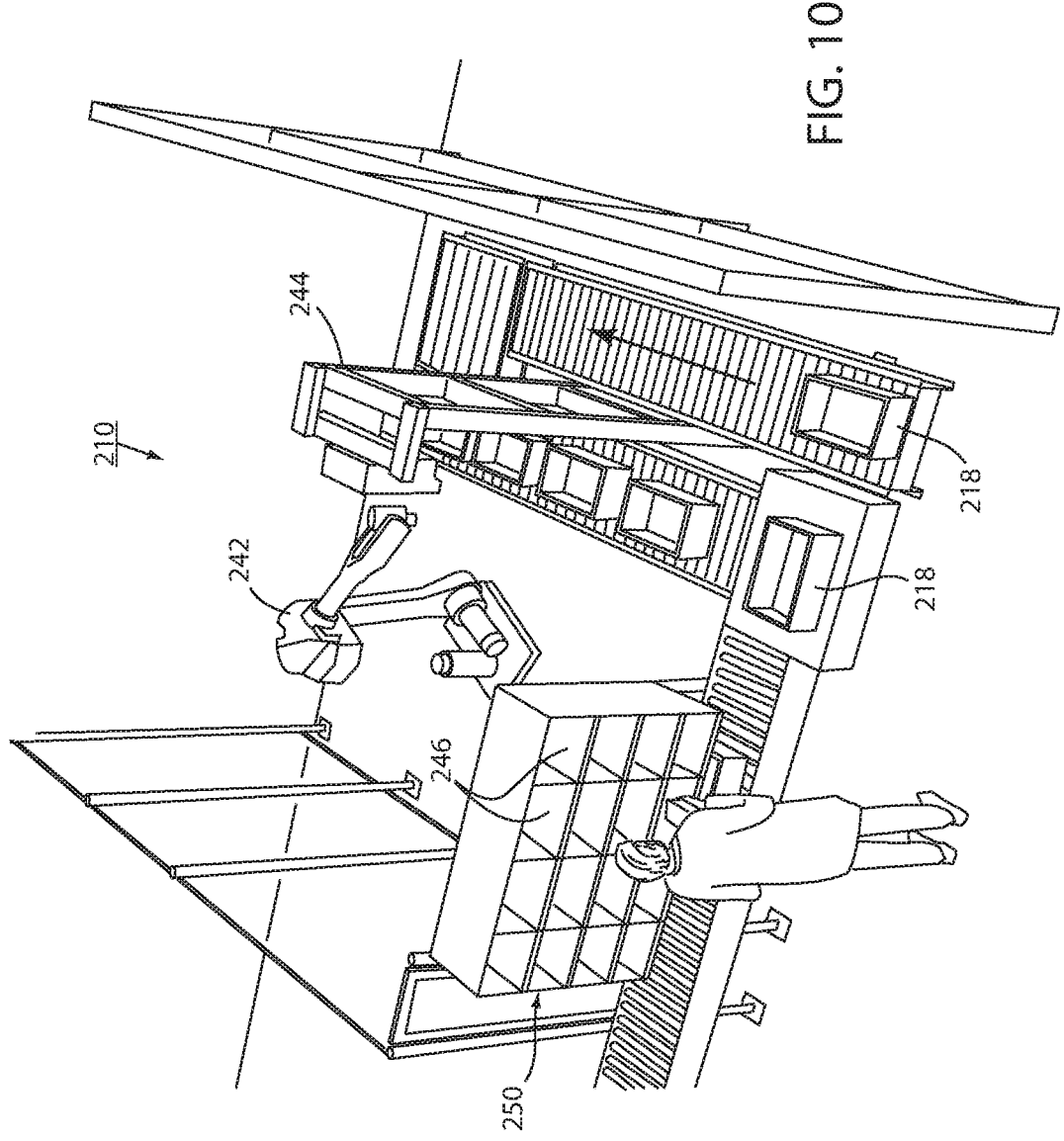
FIG. 10 is a perspective view of an automated order-picking or replenishment station.
Figure 11:
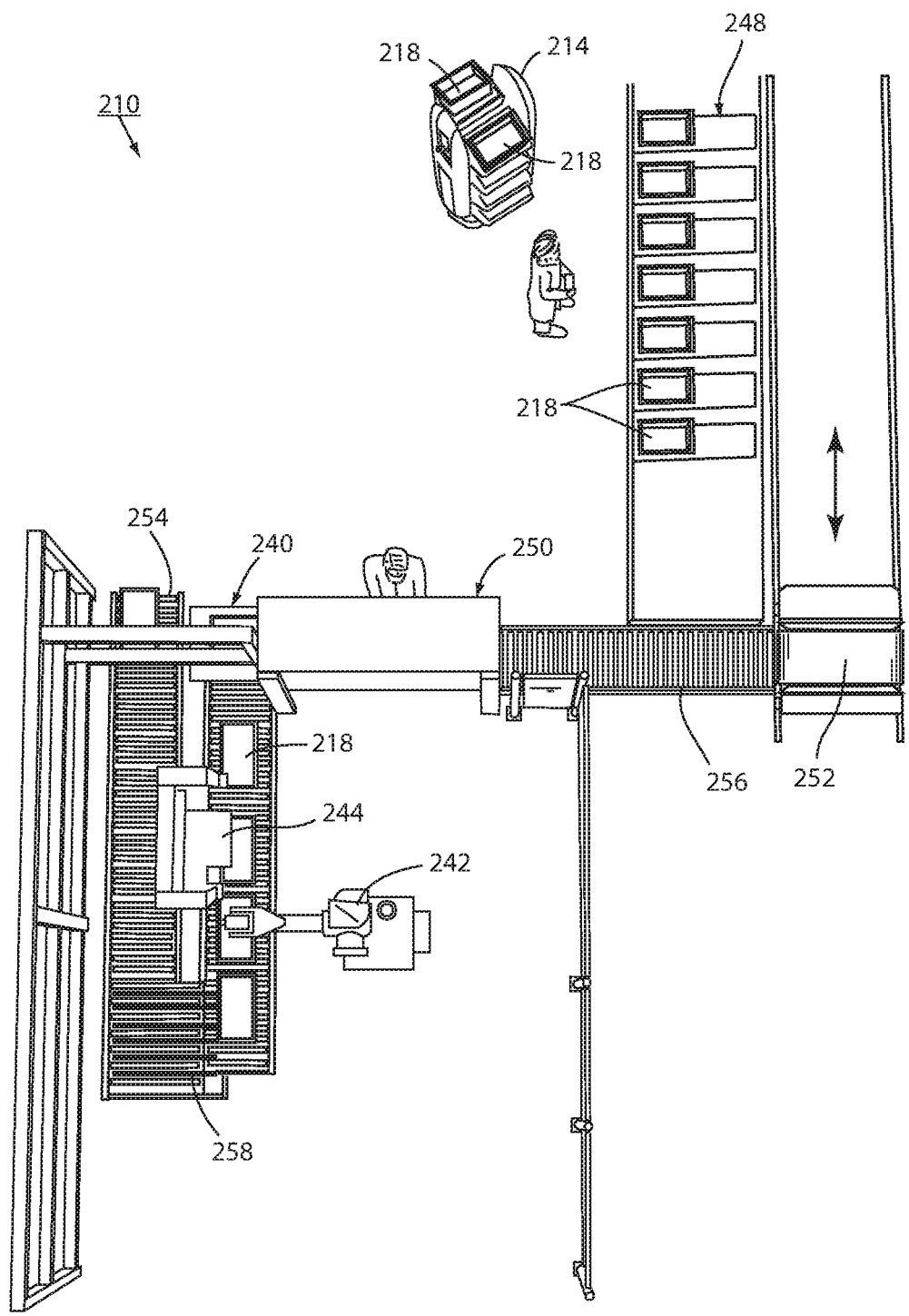
FIG. 11 is a top plan view of the station in FIG. 10.

The mobile robotic units can also be used with an order picking method 210 having a stationary robotic system 240 with a stationary robot, such as stationary picking arm 242 that is used for conducting order fulfilment and/or inventory replenishment operations (FIGS. 10 and 11). Stationary robotic system 240 includes vision equipment, or system, 244 to identify items to be picked from a receptacle 218 and to instruct arm 242 to pick the item and move the item to an assignment location 246 in a put wall 250. While the embodiment is illustrated as moving items from a receptacle to a put wall 250, the opposite could be provided, wherein items are identified in assignment locations 246, retrieved by the robot arm and placed into receptacles 218. In the illustrated embodiment, receptacles 218 are received from conveyor system 248, such as from a batch picking operation in which pickers pick all or a portion of items for a customer order, thereby making receptacles 218 "dirty pick" receptacles, meaning that they contain a number of heterogeneous items that are destined for more than one customer order and may contain only portions of a number of orders. Receptacles 218 are moved by a human operator from conveyor system 248 to mobile robotic unit 214 that has the same general characteristics as mobile robotic unit 14. Mobile robotic unit 214 transports receptacles to a conveyor system 254 where the receptacles are unloaded for conveying, such as past vision system 244. Conveyor system 254 may utilize a variety of conveying techniques, such as segmented belts, powered roller and/or a right angle transfer 258. The transfer from mobile robotic unit 214 can be by a human operator or by a robot (not shown). Conveyor system 254 transports the receptacles past vision system 244 where the items in the receptacle are identified and picked by robot 242. Robot 242 places the items in assignment locations 246, which are open on opposite sides to be accessible on one side by robot 242 and the opposite side by a human. A warehouse management system (not shown) instructs robot 242 which assignment location 246 to place the item picked from the receptacle. When all of the items are removed from a receptacle in this manner, the empty receptacle is then transported to a conveyor system 256 where an operator can use the empty receptacle to unload a completed order from an assignment location 246. Interlocks, such as proximity detectors, light curtains, or the like, prevent robot arm 242 from entering an assignment location 246 that has is being accessed by an operator. Similarly, a warning system, such as a light on put wall 250, informs the operator when the robot is placing an item in an assignment location so that the operator does not try to retrieve items from any assignment location while the robot arm is entering any assignment location. Other lights or a display may be used to inform the operator when a group of items, such as an order, is complete and ready to be loaded from its assignment location 246 to an empty receptacle. The processed receptacle is then transported by conveyor system 254 to a rail-supported vehicle 252 to be transported, such as to a pack-out station, automated storage or to replenish items in a pick-to-light fulfillment system. In the illustrated embodiment, rail supported vehicle 252 is a belt-shuttle as disclosed in International Patent Application Publication No. WO 2012/044734 A1, the disclosure of which is hereby incorporated herein by reference.

Vision system 244 locates the position of an item in two-dimensional (2D) coordinates and uses the 2D coordinates as a common reference frame for the vision equipment and the robot. The vision system creates a three-dimensional (3D) point cloud of items and uses a blob algorithm to identify connected surfaces in order to identify individual items. An end-of-arm tool, such as a vacuum-operated device, is used by stationary picking arm 242 to pick up the desired item. The vacuum is relieved in order to deposit the item in the selected assignment location 246. Vision system 244 and robot 142 are commercially available from several suppliers and may be provided as an integral unit in order to facilitate the coordinated operation. It should be understood that certain functions described as performed with mobile robotic unit 214 could be carried out by a human and certain functions described as performed with a human could be performed with a robotic unit.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An order-fulfillment picking method adapted for use in an order fulfillment facility to fulfill orders placed by individuals on-line or from a catalogue, said method comprising:

autonomously routing a plurality of autonomous mobile robotic units, wherein said autonomous mobile robotic units are capable of self-navigating without special infrastructure;

wherein at least one of said autonomous mobile robotic units comprises a robotic arm and at least one other of said autonomous mobile robotic units comprises a receptacle support;

wherein said at least one other of said autonomous mobile robotic units is separate and independent from said at least one of said autonomous mobile robotic units;

transferring articles with said robotic arm of said at least one of said embodiments mobile robotic units to or from a receptacle supported by said receptacle support of said at least one other of said autonomous mobile robotic units; and augmenting said autonomous mobile robotic units with humans by manually transferring articles to or from a receptacle supported by said receptacle support of said at least one other of said autonomous mobile units in order to add capacity during peak flow periods wherein said autonomous mobile robotic units are adapted to alter planned path of movement in order to function in the presence of persons.

2. The method as claimed in claim 1 wherein said receptacle support of said at least one other of said autonomous mobile robotic units comprises a plurality of receptacle supports and wherein said transferring including transferring articles with said robotic arm of said at least one of said autonomous mobile robotic units to or from receptacles at said receptacle supports of said at least one other of said autonomous mobile robotic units.

3. The method as claimed in claim 2 including an indicator system said indicator system indicating which of the receptacles at said receptacle supports to transfer an article to or from.

4. The method as claimed in claim 3 wherein said indicator system comprises a plurality of visual indicators each associated with one of said receptacle supports.

5. The method as claimed in claim 1 wherein said material-handling facility has a stationary automated order-picking station and including docking some of said autonomous mobile robotic units to said stationary automated order-picking station and receiving articles with said stationary order-picking station from said some of said autonomous mobile robotic units.

6. The method as claimed in claim 5 wherein said stationary automated order-picking station picks articles directly from said some of said autonomous mobile robotic vehicles.

7. An order-fulfillment picking method adapted for use in an order fulfillment facility to fulfill orders placed by individuals on-line or from a catalogue, said method comprising:

autonomously routing a plurality of autonomous mobile robotic units, wherein said autonomous mobile robotic units are capable of self-navigating without special infrastructure;

wherein at least one of said autonomous mobile robotic units comprises a robotic arm and at least one other of said autonomous mobile robotic units comprises a receptacle support;

wherein said at least one other of said autonomous mobile robotic units is separate and independent from said at least one of said autonomous mobile robotic units;

transferring articles with said robotic arm of said at least one of said embodiments mobile robotic units to or from a receptacle supported by said receptacle support of said at least one other of said autonomous mobile robotic units; and wherein said at least one other of said autonomous mobile robotic units comprises a plurality of said autonomous mobile robotic units that are attachedly coupled in a train of autonomous mobile robotic units.

8. The method as claimed in claim 7 wherein said at least one of said other of said autonomous mobile robotic units in said train of autonomous mobile robotic units is a tow vehicle that propels the rest of the other of said autonomous mobile robotic units in said train of autonomous mobile robotic units.

9. The method as claimed in claim 1 adapted for use in an order fulfillment facility that includes an article storage station, said method including picking articles to said autonomous mobile robotic units from said article storage station and putting articles from said autonomous robotic units to said article storage station wherein said article storage station includes at least one chosen from a manual station, an automated storage and retrieval system, a shuttle-based automated three-dimensional warehouse and a mini-load station.

10. An order-fulfillment picking method adapted for use in an order fulfillment facility to fulfill orders placed by individuals on-line or from a catalogue, said method comprising:

autonomously routing a plurality of autonomous mobile robotic units, wherein said autonomous mobile robotic units are capable of self-navigating without special infrastructure;

wherein at least one of said autonomous mobile robotic units comprises a robotic arm and at least one other of said autonomous mobile robotic units comprises a receptacle support;

wherein said at least one other of said autonomous mobile robotic units is separate and independent from said at least one of said autonomous mobile robotic units;

transferring articles with said robotic arm of said at least one of said embodiments mobile robotic units to or from a receptacle supported by said receptacle support of said at least one other of said autonomous mobile robotic units; and wherein at least two of said autonomous mobile robotic units are coupled to travel as a pair of autonomous mobile robotic units.

11. The method as claimed in claim 10 wherein said at least one of said autonomous mobile robotic units is attachedly coupled to said at least one other of said at least one autonomous mobile robotic units to comprise said pair of autonomous mobile robotic units.

12. An order-fulfillment picking method adapted for use in an order fulfillment facility to fulfill orders placed by individuals on-line or from a catalogue, said method comprising:

autonomously routing a plurality of autonomous mobile robotic units, wherein said autonomous mobile robotic units are capable of self-navigating without special infrastructure;

wherein at least one of said autonomous mobile robotic units comprises a robotic arm and at least one other of said autonomous mobile robotic units comprises a receptacle support;

wherein said at least one other of said autonomous mobile robotic units is separate and independent from said at least one of said autonomous mobile robotic units;

transferring articles with said robotic arm of said at least one of said autonomous mobile robotic units to or from a receptacle supported by said receptacle support of said at least one other of said autonomous mobile robotic units;

wherein said material-handling facility includes at least one pick station and wherein said transferring articles includes transferring articles with said robotic arm between a receptacle supported by said receptacle support of said at least one other of said autonomous mobile robotic units and said at least one pick station; and augmenting said autonomous mobile robotic units with humans by manually transferring articles between said receptacle supported by said receptacle support and said at least one pick station in order to add capacity during peak flow periods wherein said autonomous mobile robotic units are adapted to alter planned path of movement in order to function in the presence of persons.

13. The method as claimed in claim 12 wherein said transferring articles includes putting articles to said at least one pick station in order to replenish said at least one pick station.

14. The method as claimed in claim 12 wherein said transferring articles includes putting articles to said at least one pick station in order to replace articles returned by a customer.

15. The method as claimed in claim 12 wherein said receptacle support of said at least one other of said autonomous mobile robotic units comprises a plurality of receptacle supports and wherein said transferring articles including picking articles from the pick station with said robotic arm of said at least one of said autonomous mobile robotic units to receptacles at said receptacle supports of said at least one other of said autonomous mobile robotic units or putting articles from receptacles at said receptacle supports with said robotic arm of said at least one of said autonomous mobile robotic to the pick station.

16. An order fulfillment facility that is adapted to fulfill orders placed by individuals on-line or from a catalogue, said facility comprising:

a pick station having items to fulfill orders placed by individuals on-line or from a catalogue;

a plurality of autonomous mobile robotic units that are adapted to be autonomously routed in the order fulfillment facility, wherein said autonomous mobile robotic units are capable of self-navigating without special infrastructure;

wherein at least one of said robotic units comprises a robotic arm and at least one other of said robotic mobile robotic units comprises a receptacle support;

wherein said at least one other of said autonomous mobile robotic units is separate and independent from said at least one of said autonomous mobile robotic units;

wherein said at least one of said robotic units is adapted to transferring articles with said robotic arm between a receptacle supported by said receptacle support of said at least one other of said autonomous mobile robotic units and said pick station; and wherein said autonomous mobile robotic units are adapted to alter planned path of movement in order to function in the presence of persons and wherein said at least one other of said autonomous mobile units are adapted to augmentation with humans manually transferring articles between said receptacle supported by said receptacle support and said pick station in order to add capacity during peak flow periods.

17. An order fulfillment facility that is adapted to fulfill orders placed by individuals on-line or from a catalogue, said facility comprising:

a pick station having items to fulfill orders placed by individuals on-line or from a catalogue;

a plurality of autonomous mobile robotic units that are adapted to be autonomously routed in the order fulfillment facility, wherein said autonomous mobile robotic units are capable of self-navigating without special infrastructure;

wherein at least one of said robotic units comprises a robotic arm and at least one other of said robotic mobile robotic units comprises a receptacle support;

wherein said at least one other of said autonomous mobile robotic units is separate and independent from said at least one of said autonomous mobile robotic units; and wherein said at least one of said robotic units is adapted to pick articles with said robotic arm from said pick station to a receptacle supported by said receptacle support of said at least one other of said autonomous mobile robotic units to fulfill orders or is adapted to put articles with said robotic arm from a receptacle supported by said receptacle support of said at least one other of said autonomous mobile robotic units to said pick station in order to replenish said pick station; and wherein said autonomous mobile robotic units are adapted to alter planned path of movement in order to function in the presence of persons and wherein said at least one other of said autonomous mobile units are adapted to augmentation with humans manually picking articles from said pick station to said receptacle supported by said receptacle support or manually putting articles from said receptacle supported by said receptacle support to said pick station in order to add capacity during peak flow periods.

18. The order fulfillment facility as claimed in claim 17 wherein said at least one of said autonomous mobile robotic units is both adapted to pick articles with said robotic arm from said pick station to a receptacle supported by said receptacle support of said at least one other of said autonomous mobile robotic units to fulfill orders and is adapted to put articles with said robotic arm from a receptacle supported by said receptacle support of said at least one other of said autonomous mobile robotic units to said pick station in order to replenish said pick station.

19. A robotic system adapted for use in order fulfillment facility that is adapted to fulfill orders placed by individuals on-line or from a catalogue, the order fulfillment facility having a pick station having items to fulfill orders placed by individuals on-line or from a catalogue; said robotic system comprising:

a plurality of autonomous mobile robotic units that are adapted to be autonomously routed in the order fulfillment facility, wherein said autonomous mobile robotic units are capable of self-navigating without special infrastructure;

wherein at least one of said robotic units comprises a robotic arm and at least one other of said robotic mobile robotic units comprises a receptacle support;

wherein said at least one other of said autonomous mobile robotic units is separate and independent from said at least one of said autonomous mobile robotic units; and wherein said at least one of said robotic units is adapted to transferring articles with said robotic arm between a receptacle supported by said receptacle support of said at least one other of said autonomous mobile robotic units and the pick station; and wherein said autonomous mobile robotic units are adapted to alter planned path of movement in order to function in the presence of persons and wherein said at least one other of said autonomous mobile units are adapted to augmentation with humans manually receiving articles transferred to or allow articles to be manually transferred from a receptacle supported by said receptacle support in order to add capacity during peak flow periods.

* * * * *